United States Patent [19]

Sanchez

[11] 4,293,878
[45] Oct. 6, 1981

[54] IMAGE PROJECTOR FOR A TELEVISION RECEIVER

[76] Inventor: Jacinto Sanchez, 692 W. 29 St., Apt. 12, Hialeah, Fla. 33012

[21] Appl. No.: 148,774

[22] Filed: May 12, 1980

[51] Int. Cl.³ .................... H04N 5/74; H04N 9/31
[52] U.S. Cl. ................................ 358/231; 358/237; 358/254; 358/60; 358/63
[58] Field of Search ............... 358/231, 237, 60, 63, 358/238, 239, 250, 248, 249, 254, 255

[56] References Cited

U.S. PATENT DOCUMENTS

| | | | |
|---|---|---|---|
| 4,021,105 | 5/1977 | Schubach | 358/256 |
| 4,051,535 | 9/1977 | Inglis | 358/250 |
| 4,058,837 | 11/1977 | Muntz | 358/237 |
| 4,074,322 | 2/1978 | Cammilleri | 358/237 |
| 4,208,676 | 6/1980 | Berwick | 358/237 |
| 4,215,373 | 7/1980 | Goldenberg | 358/237 |
| 4,231,067 | 10/1980 | Jewell | 358/237 |

FOREIGN PATENT DOCUMENTS 2310048 11/1976 France ................. 358/237

*Primary Examiner*—Michael A. Masinick
*Attorney, Agent, or Firm*—John Cyril Malloy

[57] ABSTRACT

For a television receiver, an image projection device comprising a housing having a front wall with openings and an opening fitting over the television receiver screen. The housing includes an underside having support means for setting the angle of projection of the receiver. The receiver is adapted for connection with an inner shroud member extending through the open front wall. The housing includes an outer projection shroud surrounding the inner shroud having an open terminal end. The inner and outer shrouds include side walls which are parallel, converging and spaced apart. A lens projecting extension member including a lens mounted at the open terminal ends of the shroud and aligned with the concentrated image from the inner shroud.

9 Claims, 8 Drawing Figures

IMAGE PROJECTOR FOR A TELEVISION RECEIVER

BACKGROUND OF THE INVENTION

Technical Field

This invention relates to projection lenses, and more particularly, to projection lenses for television receivers.

Television has become a multi-billion dollar business over the past ten years. Millions upon millions of viewers have discovered that television is relaxing and may prove to be educational. Under this theory, many companies desire to improve and develop television to its fullest extent. Color television, for instance, has improved to the extent that it is sometimes difficult to tell the figures from real life when the figures are large enough as in the Advent TM Video Beam and the like are used. Many companies including Panasonic TM and Sony TM, as well as RCA TM and a number of other companies have attempted to take a television receiver and enlarge the images to enlarged life-like figures. These systems involve the use of complicated and sophisticated electronics and optics.

Applicant has developed a structure for enlarging television receiving images so that they too may appear life-like without the need and aid of complicated and sophisticated electronic and optics. Applicant's system uses a number of converging parallelepiped structures aligned in a particular manner to achieve an enlarged image when projected. Using applicant's system, one or ordinary skill in the art without the knowledge of optics may easily install applicant's structure and obtain results similar to that achieved by the more expensive systems of Advent TM, Panosonic TM and the like.

It must also be pointed out that U.S. Pat. Nos. 4,074,322, 4,058,837, as well as 4,021,105, and 4,051,535 have attempted to utilize less complicated optics and no electronics to achieve this heretofore set forth objective. However, applicant has found all these devices to be cumbersome inasmuch as they are more complicated than his and thus, more expensive and difficult to manufacture.

SUMMARY OF THE INVENTION

A television projection receiver including a housing having support means for angling the beam of light emitted from the television receiver. The housing surrounding the television receiver having an open front wall aligned with the television receiver screen and further openings in the front wall for television controls. The television receiver screen is adapted with a lens projector which is fixedly mounted thereto. The lens includes side walls which are converging to concentrate the images of the receiver. The housing includes a lens projection shroud fixedly connected to the housing and surrounding the projection lens. The shroud includes side walls which are converging and parallel to the lens projection side walls, and an open terminal end which may be flared. A lens extension member rests partially within the open terminal end of the shroud and is in the shape of a parallelepiped having a first and a second open end. The support means may be adjustable for adjusting the angle of projection.

DESCRIPTION OF THE PREFERRED EMBODIMENT

Figure 1:
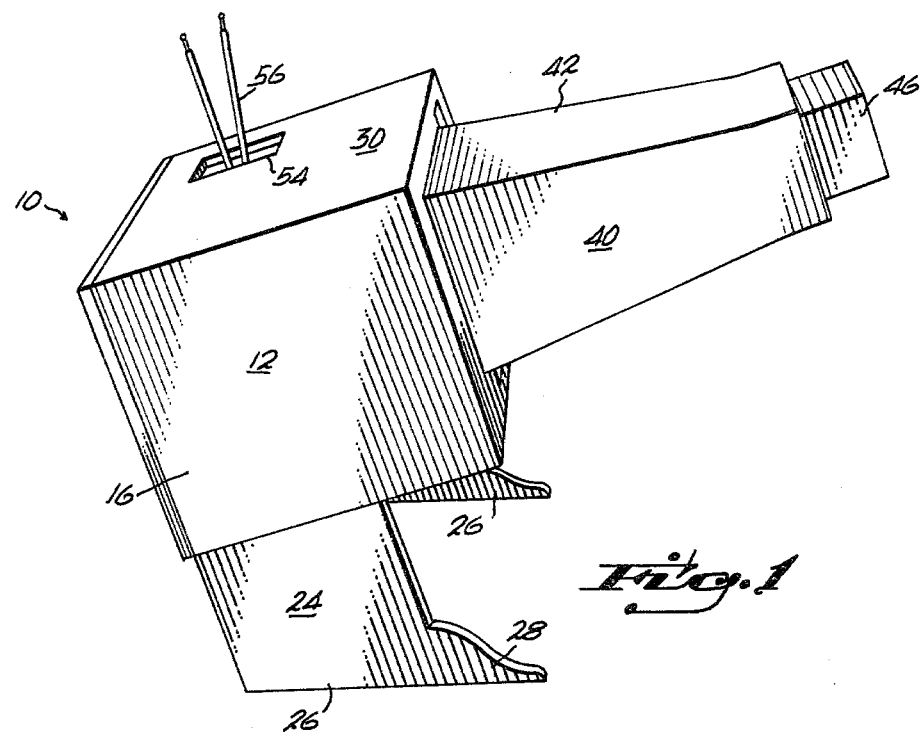
FIG. 1 is a perspective view of one embodiment of the invention having the television receiver in place.

Referring to the drawings wherein like reference characters designate like or corresponding parts throughout the several views and referring particularly to FIG. 1, there is shown the fixed support embodiment of the invention, a television projection receiver, generally designated by the numeral 10. As can be seen clearly in FIGS. 2 and 4, the projection receiver includes a housing 12 having an open front wall 14, side walls 16, a rear 18 having ventilation holes 20 (see FIG. 3).

Figure 4:
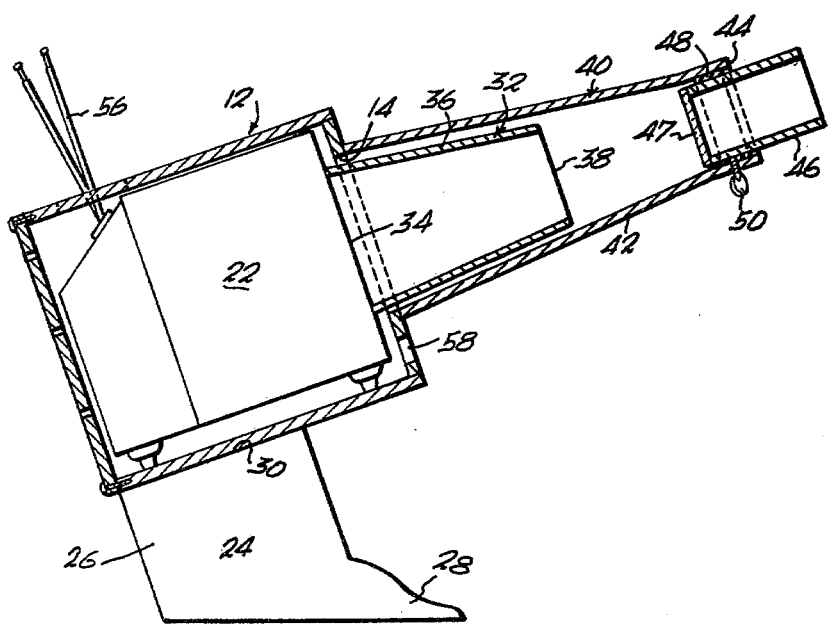
FIG. 4 is a cross sectional view of the embodiment shown in FIG. 3.
Figure 5:
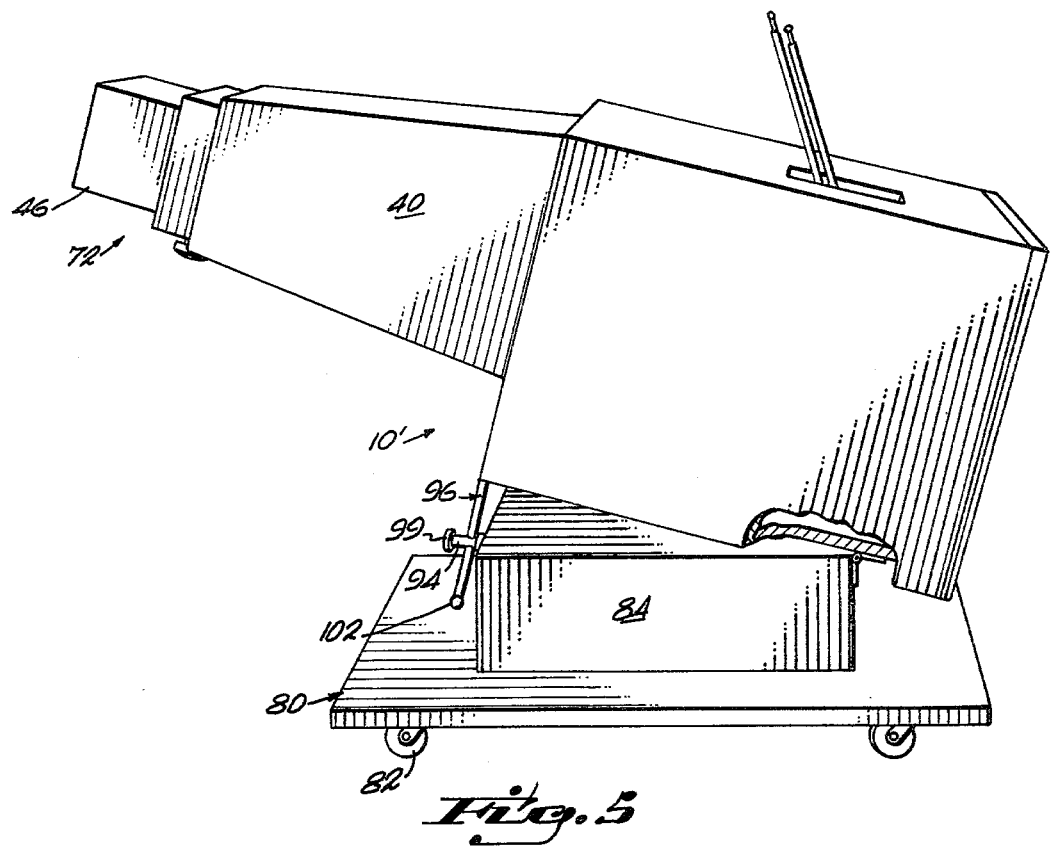
FIG. 5 is a perspective side view of the adjustable projection lens angle embodiment of the invention shown in partial cross section.

The housing is shaped and sized to accept a conventional television receiver such as 22, clearly shown in FIG. 4.

The housing is held above the horizontal by a support means generally denoted by numeral 24. In the embodiment shown in FIGS. 1 through 4, the support means is fixed meaning that the angle of projection remains constant. The support means in the embodiment shown in FIGS. 1 through 4 comprises a pair of legs 26 having feet 28 and a top end 30 supporting the housing and angling the housing for projection. As will be appreciated more fully hereinafter, the angle of projection may be changed depending upon the top support structure 30 and the user's desire.

The conventional television receiver 22 is adapted with an inner shroud 32 fixedly mounted over the screen 34 of the television receiver 22. The inner shroud comprises a tunnel-shaped structure having converging side walls 36 and an open terminal end 38.

An outer projection shroud 40 surrounds the inner shroud and is fixedly attached to the housing 12. The outer shroud includes converging side walls such as at 42 terminating at an open end 44 which may be flared as shown in FIG. 4. A lens shroud extension 46 may then be placed within the open end 44 concentrating and focusing the light from receiver 22 through a lens 47. The extension is mounted within the shroud 40 through a gasket 48 and is held in place by a locking means 50 which may be a simple wing nut tightening the extension member against the extension 46.

The receiver emits light through its screen 34 which is then projected by converging side walls 36 of lens extension member 32 and further concentrated by the side walls 42 of shroud 40 for focusing and projection by the lens extension member 46. The angle of projection will be determined by the support means 24 and particularly the angle of the legs 26 and connecting surface 30.

Figure 2:
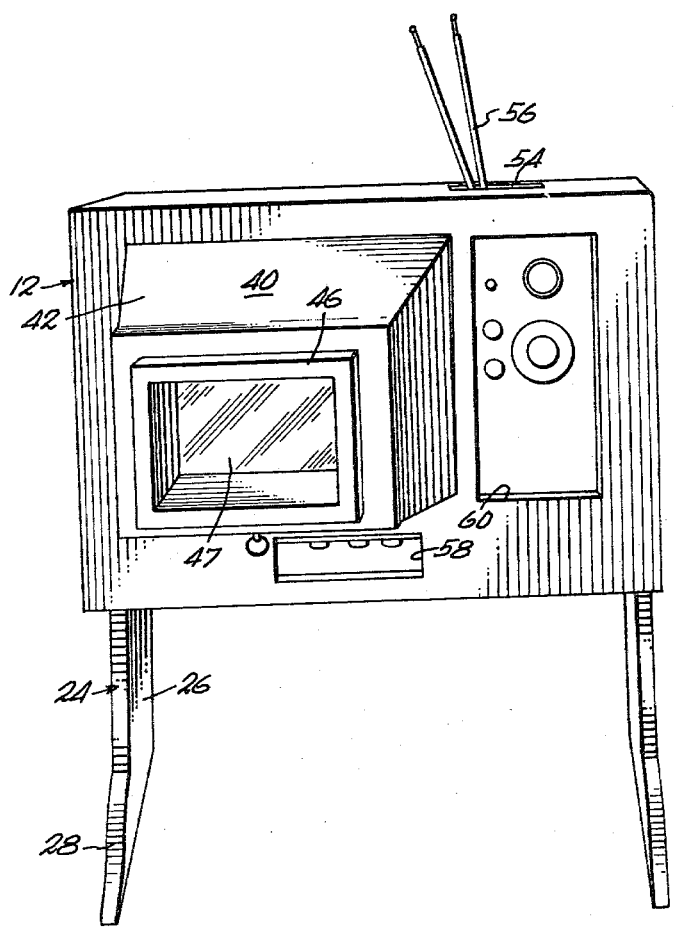
FIG. 2 is a front perspective view of the embodiment shown in FIG. 1.
Figure 3:
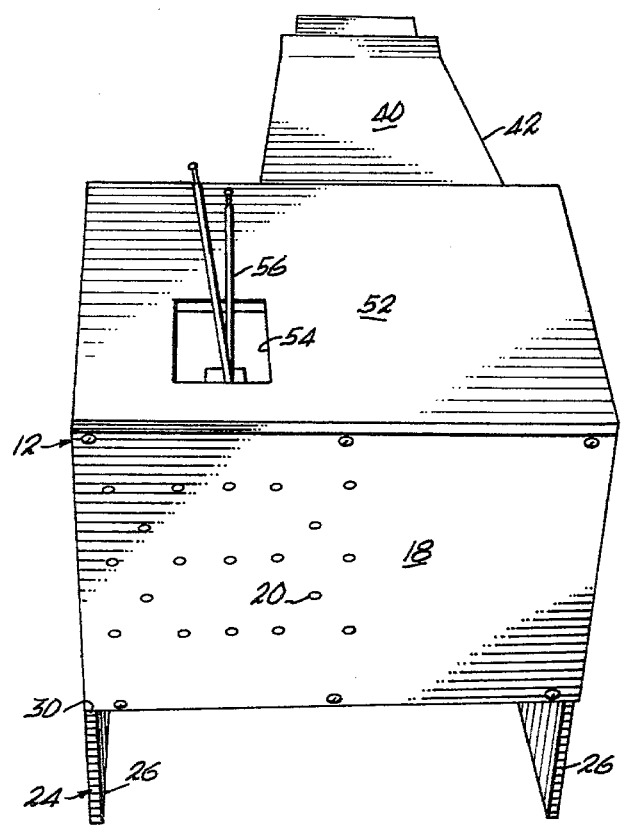
FIG. 3 is a rear perspective view of the embodiment shown in FIG. 2.

The heat which will inevitably build up as a result of use can be dissipated through vent holes 20, such as those shown in FIG. 3. The housing may also include a top 52 having an opening 54 for adaption of the antenna 56 shown clearly in FIGS. 1 through 3. Additionally, as can be seen in FIG. 2, further openings in the front wall may be made such as at 58 and 60 for adaption of television control knobs.

The second embodiment shown in FIGS. 5 through 8 and generally denoted by the numeral 10' includes an adjustable support means 70 for adjusting the angle of projection. The basic structure of the housing 12 and the outer shroud 40 remain the same. However, an alternate form of lens extension means 72 can be adapted to this embodiment as well as the previous embodiment and is more clearly shown in FIG. 8. A mounting block 74 may be adapted to the open terminal end of the shroud 76 instead of flaring the shroud as clearly shown in FIG. 4. Otherwise, the connection means for the extension 46 still comprises a gasket 48 with a wing nut tightening means 50.

Figure 6:
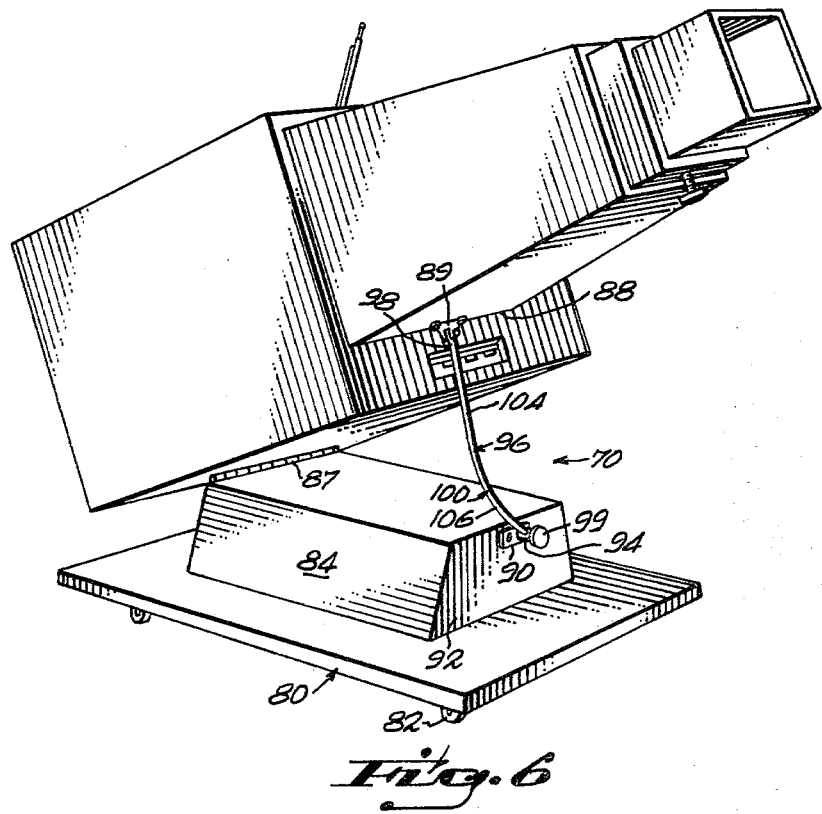
FIG. 6 is a perspective view of the adjustable embodiment of the invention.
Figure 7:
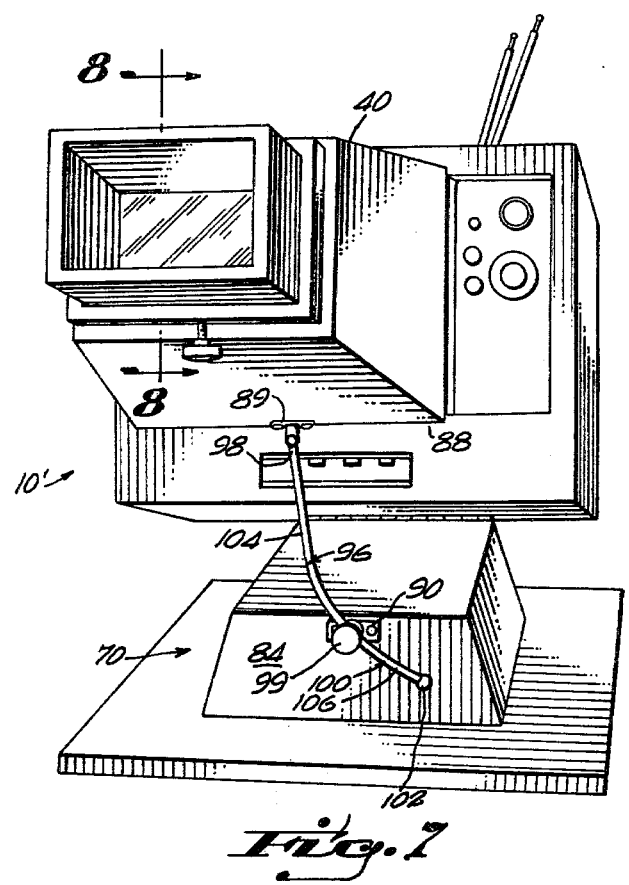
FIG. 7 is a front perspective elevational view of the adjustable embodiment.
Figure 8:
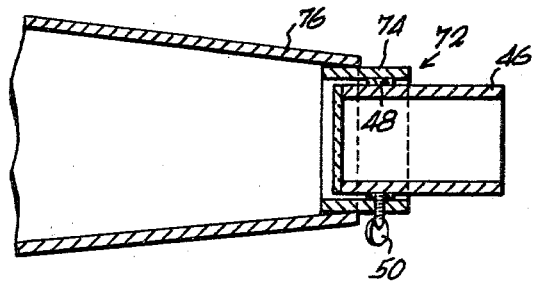
FIG. 8 is a cross sectional view of the adjustable embodiment of the invention taken along lines 8—8 of FIG. 7.

The adjustable support means 70 comprises a base 80 having wheel means such as at 82 connected to the underside of base. A stand 84 is located centrally upon base 80 and rises above base 80 a predetermined distance. Stand 84 includes a rear end having a hinge 87 for hinged connection to the underside of housing 12 as shown in FIG. 6. Thus, the stand and housing are swingably connected. The shroud 40 includes a rear end lateral edge 88 joining the housing and the shroud and including a pivot fitting 89. Another fitting 90 is connected to the stand front side 92 and includes a guide fitting means 94. An operator rod 96 having a first end 98 is pivotally connected to the fitting 89. The second end 100 of operator rod 96 is slidable through guide means 94 which includes a set screw 99. As shown in FIG. 7, the second end of operator 96 may include a handle means such as at 102. It will be appreciated that the operator may be of various shapes and sizes and the one that the applicant has found to be particularly useful is an operator having a relatively straight first portion 104 and a second terminal portion 106 which is slightly arcuate in shape for sliding engagement through guide means 94 as indicated in FIGS. 6 and 7.

In Use

The handle is used to slide the operator to and fro in the guide means 94 and once the desired angle of projection is reached, a locking means, the set screw, 99, may be tightened to hold the angle of projection desired.

Using the embodiment shown and described heretofore, applicant has developed a system of lens projection structures wherein a television receiver may be converted to a projection receiver without the aid of additional electronics and expensive optics which can prevent the ordinary person from purchasing such a unit.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination a television receiver having an image screen and an image projection device, said device comprising a housing sized to receive the television receiver, said housing including a front wall and said front wall having an opening sized and shaped to fit compatibly over the television receiver screen, means for supporting the housing and a television receiver in the housing with the opening of the screen of the television receiver and the housing tilted at a common angle with respect to a horizontal reference line through the screen, an inner projection shroud fixedly mounted to the television receiver screen, said inner shroud extending a predetermined distance from the screen, and said inner shroud having tapered side walls converging to a terminal end at a common plane, an outer shroud fitted over the open wall of the housing and enclosing said inner shroud, said outer shroud having an open terminal end spaced a predetermined distance from said open housing wall and said outer shroud having tapered side walls converging to a terminal end at a common plane spaced from said first mentioned common plane, and lens extension means fixedly connected to the open terminal end of the outer shroud and said lens extension means including a lens.

2. The device as set forth in claim 1 wherein the front wall of the housing has openings sized for receiving television controls.

3. The device as set forth in claim 1 wherein the housing includes fixed support means.

4. The device as set forth in claim 2 wherein the housing includes a back wall having vent holes.

5. The device as set forth in claim 1 wherein the support means comprises an adjustable support means thereby allowing the angle of projection to be adjusted by the user as needed.

6. The device as set forth in claim 5 wherein the housing includes a rear end and the adjustable support means comprises, a stand hingedly connected to the housing, and wherein the stand includes a fitting having set screw locking means, and an operator rod having a first end connected to the shroud and a second end threaded through the fitting for slidable engagement therewith allowing the user to adjust the angle of projection.

7. The device as set forth in claim 6 wherein the outer shroud includes gasket means at its open terminal end having releasable locking means for releasably locking the lens extension member at the terminal end of the outer shroud.

8. The device as set forth in claim 6 wherein the outer shroud includes an underside having an underside edge fixedly connected to the housing with an operator fitting connected thereto and wherein the stand operator fitting comprises a guide means having set screw locking means and wherein the operator rod first end includes a universal attached to the shroud underside fitting and the second operator is end extends through the guide means and includes a handle means for sliding the operator to and fro in the guide means for adjusting the projection angle and the guide means includes locking means locking the operator in position thereby setting and fixing the angle of projection.

9. The device as set forth in claim 8 wherein the base includes an underside having wheel means for portable movement of the lens projection receiver.

* * * * *